United States Patent [19]

Harriman et al.

[11] Patent Number: 5,898,687
[45] Date of Patent: Apr. 27, 1999

[54] ARBITRATION MECHANISM FOR A MULTICAST LOGIC ENGINE OF A SWITCHING FABRIC CIRCUIT

[75] Inventors: Guy Harriman, Sunnyvale; Yang-Meng Arthur Lin, San Ramon, both of Calif.

[73] Assignee: Cisco Systems, Inc., San Jose, Calif.

[21] Appl. No.: 08/686,104

[22] Filed: Jul. 24, 1996

[51] Int. Cl.[6] .................................................. H04L 12/28
[52] U.S. Cl. ........................ 370/390; 370/395; 370/389
[58] Field of Search .................................... 370/390, 391, 370/393, 394, 395, 399, 412, 414, 389

[56] References Cited

U.S. PATENT DOCUMENTS

| | | | |
|---|---|---|---|
| 4,734,907 | 3/1988 | Turner | 370/390 |
| 4,813,038 | 3/1989 | Lee | 370/389 |
| 5,130,984 | 7/1992 | Cisneros | 370/399 |
| 5,179,556 | 1/1993 | Turner . | |
| 5,229,991 | 7/1993 | Turner | 370/390 |
| 5,237,571 | 8/1993 | Cotton et al. . | |
| 5,287,346 | 2/1994 | Bianchini, Jr. et al. . | |
| 5,287,530 | 2/1994 | Davis et al. . | |
| 5,291,477 | 3/1994 | Liew . | |
| 5,301,055 | 4/1994 | Bagchi et al. . | |
| 5,305,311 | 4/1994 | Lyles . | |
| 5,309,430 | 5/1994 | Verhille et al. . | |
| 5,323,389 | 6/1994 | Bitz et al. . | |
| 5,365,519 | 11/1994 | Kozaki et al. . | |
| 5,400,325 | 3/1995 | Chatwani et al. . | |
| 5,402,415 | 3/1995 | Turner . | |
| 5,440,548 | 8/1995 | Denissen | 370/390 |
| 5,479,401 | 12/1995 | Bitz et al. . | |
| 5,528,588 | 6/1996 | Bennett et al. . | |
| 5,535,197 | 7/1996 | Cotton | 370/414 |
| 5,541,918 | 7/1996 | Ganmukhi et al. . | |
| 5,548,588 | 8/1996 | Ganmukhi et al. . | |
| 5,572,522 | 11/1996 | Calamvokis | 370/390 |
| 5,610,914 | 3/1997 | Yamada | 370/395 |
| 5,687,324 | 11/1997 | Green | 370/414 |
| 5,689,505 | 11/1997 | Chiusi | 370/388 |

*Primary Examiner*—Ajit Patel
*Assistant Examiner*—Ricardo M. Pizarro
*Attorney, Agent, or Firm*—Cesari and McKenna, LLP

[57] ABSTRACT

A multicast engine of a shared-memory switching fabric circuit increases the replication rate of data elements destined for multicast connections within a network switch by manipulating address information relating to those elements. The multicast engine cooperates with other components of the switching fabric circuit to minimize the total buffer requirements of the switch by storing only a single copy of each multicast data element in a location of shared memory. Specifically, the engine has a pipelined architecture that provides a multicasting capability for the switching fabric circuit by replicating only an address pointer to that memory location for each destination of the multicast connection.

15 Claims, 3 Drawing Sheets

ARBITRATION MECHANISM FOR A MULTICAST LOGIC ENGINE OF A SWITCHING FABRIC CIRCUIT

FIELD OF THE INVENTION

This invention relates to switching fabric circuits of network switches and, more particularly, to multicasting operations performed by such switching fabric circuits.

BACKGROUND OF THE INVENTION

A network switch of a data communications network provides a "switching" function for transferring information among entities of the network. Typically, the switch is a computer comprising a collection of ports interconnected by a switching fabric circuit. Each port couples the switch to a network entity over any of various types of media, including point-to-point serial line, Ethernet, FDDI or token ring connections. A network entity may consist of any device that "sources" (i.e., transmits) or "sinks" (i.e., receives) information over such media.

The switching function provided by the switch typically comprises receiving information at an input port from a network entity, forwarding that information to at least one other output port and, thereafter, transmitting the information over at least one medium to another entity of the network. In the case of an asynchronous transfer mode (ATM) switch, the information is forwarded among the ports as a plurality of fixed-length data elements, or cells. Each cell is 53 bytes in length and consists of a 5-byte header field appended to a 48-byte data ("payload") field. The header field contains routing and other address information, e.g., virtual path (VP) and virtual circuit (VC) connection information, for the cell that is translated prior to transmission over the network.

Often, the destination of a cell may be more than one output port of the switch; this type of data transfer may involve a broadcast or multicast data connection. Point-to-multipoint connections generally degrade the performance of a switch because of the overhead needed to effect the translation and forwarding decisions for the cell. These decisions are typically rendered by the switching fabric circuit; examples of such fabrics include a shared-memory switching fabric, a shared-medium, output-buffered switching fabric based on, e.g., a time division multiplexing bus, and a crossbar, input-buffered switching fabric.

The bus-based switching fabric circuit is a multipoint data path that is shared among the ports. This architecture facilitates replication of an ATM cell because those ports destined to receive the cell merely copy its contents from the bus with essentially no replication latency. However, each copy of the cell is physically stored in an output buffer memory of the port, thereby necessitating a significant amount of total buffer capacity in order to effectively implement the multicasting capability.

The shared-memory architecture provides a generally higher buffer efficiency than other switching fabrics because of statistical buffer sharing, while achieving the optimal delay-throughput performance of bus-based switching for unicast (point-to-point) connection traffic. Yet, implementation of multicast functionality generally suffers from potentially slower multicast replication rates. The invention is directed to a mechanism for increasing the replication rate of a switching fabric circuit having a multicasting capability that requires minimal buffer capacity for multicast connection traffic.

SUMMARY OF THE INVENTION

The invention comprises a multicast engine of a shared-memory switching fabric circuit that increases the replication rate of data elements destined for multicast connections within a network switch by manipulating address information relating to those elements. In addition, the multicast engine cooperates with other components of the switching fabric circuit to minimize the total buffer requirements of the switch by storing only a single copy of each multicast data element in a location of shared memory. As described further herein, these features of the invention are realized by a multicast engine having a pipelined architecture that replicates only an address pointer that references the shared memory location of the multicast data element for each destination of the connection.

In the illustrative embodiment, the network switch is an asynchronous transfer mode (ATM) switch configured to receive both unicast and multicast ATM cells at an input port and to transfer those cells to selected output ports of the switch. Upon receiving a cell, the switching fabric extracts the payload data from the cell, stores it in the shared memory and records the memory address of that payload location in an address pointer. The remaining header information is processed by an input translation function that generates (i) a key indicating whether the cell requires multicast replication, (ii) a priority value for each cell specifying a predetermined priority level for the cell at the selected output port, and (iii) the connection address of the selected output port. If the cell does not require multicast replication, the header information is passed onto an appropriate one of a plurality of unicast output queues. Preferably, there is a dedicated unicast output queue for each output port of the switch at each predetermined priority level.

If the cell requires multicast replication, it is forwarded to the multicast engine of the switching fabric circuit. According to an aspect of the invention, the pipelined structure of the engine comprises an input buffer stage for storing the key, priority value and connection address, along with the address pointer to the payload location in shared memory, prior to manipulation by an output queue selection stage of the engine. This latter stage essentially comprises a plurality of multicast output queues manipulated by control logic; as is the case for unicast traffic, there is preferably one multicast output queue for each output port of the switch at each predetermined priority level.

According to another aspect of the invention, the multicast engine copies the address pointer to the selected queues of the output stage during each cycle of replication, e.g., during a cell time period. In other words, rather than copying the entire contents of the cell, the engine reproduces only the address pointer to increase the replication rate of the multicast operation while also reducing the buffer capacity required for that operation. In particular, the multicast engine manipulates the address pointer to produce the required number of replicated cells prior to releasing the payload location in shared memory.

The number of replicated cells is a property of the multicast connection address; accordingly, the connection address is used by the engine to determine the number of replicated cells needed for a particular multicast connection. Specifically, the connection address is used as an index into a replication table having a plurality of entries, each of which contains control information specifying selected output queues for receiving the multicast cell. In accordance with this aspect of the invention, the connection address identifies a particular entry of the table and multicast replication is effected by copying the address pointer of a multicast input cell to each of the selected multicast output queues specified by the control information.

In furtherance of its switching function, the shared-memory fabric decides whether a unicast or multicast cell is transferred to a selected output port of the switch during a predetermined cell time period. According to yet another aspect of the invention, the fabric renders this decision using a "fair-sharing" arbitration policy that services the unicast and multicast queues in parallel based on the relative priority levels of the queues. That is, each port of the switch has a unicast/multicast output queue pair for each predetermined priority level. At each cell time, the arbitration mechanism evaluates the states of these queue pairs and transmits a cell from a non-empty pair having the highest priority. Moreover, priority of transmission within a queue pair alternates between the multicast and unicast elements at each cell time.

Prior to transmitting a cell, the payload data stored in shared memory is retrieved for the copy of the address pointer associated with the cell. The switching fabric then appends new header information to the retrieved payload data. This header information is derived by an output translation function in response to the connection address generated by the input translation function. As a result, the invention efficiently implements multicasting operations without consuming substantial memory resources.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENTS

Figure 1:
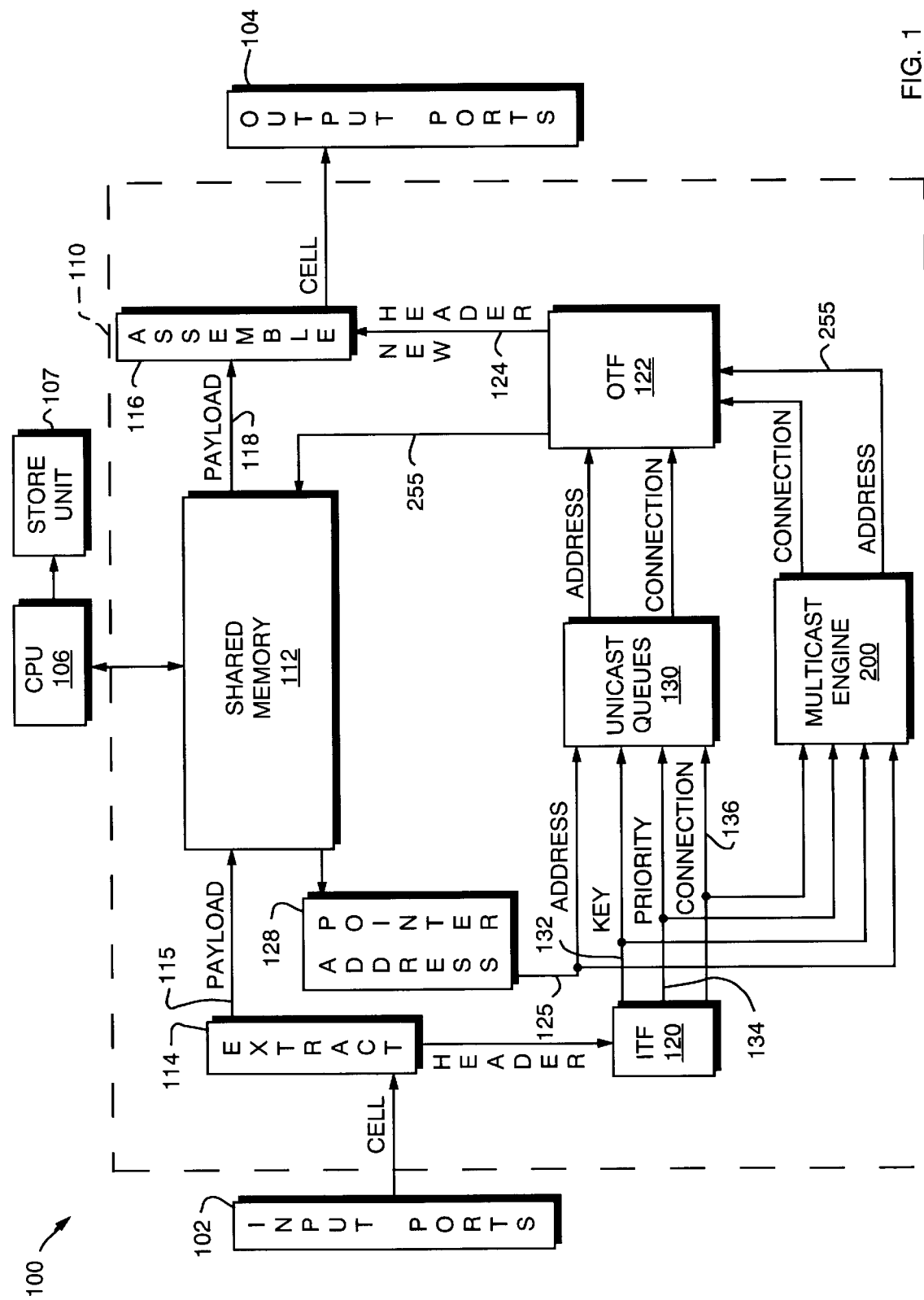
FIG. 1 is a schematic block diagram of a shared-memory switching fabric circuit for interconnecting ports of a network switch that may be advantageously used with the present invention.

FIG. 1 is a schematic block diagram of a network switch 100 comprising a shared-memory switching fabric circuit 110 for transferring information among input ports 102, output ports 104 and a central processing unit (CPU) 106. The switch 100 is preferably an asynchronous transfer mode (ATM) switch configured with N input ports and N output ports; in the illustrative embodiment described herein, there are preferably thirty-two (32) input ports and thirty-two (32) output ports. Information is transferred between the input and output ports via the switching fabric 110 as a plurality of fixed-length data elements or ATM cells. Each ATM cell is 53 bytes in length and consists of a 5-byte header field appended to a 48-byte data ("payload") field. The header field contains cell routing and address information, e.g., virtual path (VP) and virtual circuit (VC) connection information, that is preferably translated prior to transmission over a link of the network. It should be noted that other network switches configured to transfer, e.g., data packets, among its ports may be used in accordance with the inventive teachings set forth herein.

At the heart of the switching fabric 110 is a shared memory store unit 112 having storage locations typically composed of random access memory (RAM) devices addressable by the CPU and ports. An operating system, portions of which are typically resident in memory store unit 107 and executed by the CPU, functionally organizes the switch by, inter alia, invoking network operations in support of switching processes executing on the switch 100.

Coupled to the shared memory are a conventional extraction circuit 114 that apportions each cell received at the switching fabric 110 into its constituent payload and header information fields, and a conventional assemble circuit 116 that appends these fields to form a reconstituted ATM cell prior to transferring the cell to the output ports. The switching fabric 110 further comprises an input translation function (ITF) 120 connected to the extract circuit 114 and an output translation function (OTF) 122 connected to the assemble circuit 116. As described herein, these translators cooperate to convert the contents of each received cell header field to a new header in connection with conventional translation methods.

As noted, the switching function provided by the ATM switch 100 typically comprises receiving an input cell at a source port 102 from a network entity, forwarding that cell to a destination port 104 through the switching fabric circuit 110 and, thereafter, transmitting an output cell over a medium to another entity of the network. To accomodate this type of point-to-point connection traffic, a plurality of unicast output queues 130 are provided by the fabric circuit 110. Each queue 130 comprises a plurality of "fictitious" priority queues for storing unicast cells at any of P different priority levels. In the illustrative embodiment, there are preferably four (4) different priority levels, such that there is a dedicated unicast output queue for each of the 32 output ports of the switch at each of the priority levels.

Upon receiving a cell from the source port 102, the switching fabric 110 extracts the payload data from the cell, stores it in its shared memory 112 over line 115 and records the memory address of that payload location in an address pointer 128. The payload location recorded in the pointer 128 comprises a K-bit memory address; e.g., the K-bit address is a 16-bit address. The ITF 120 processes the remaining header information to generate (i) a key over line 132 indicating whether the cell requires multicast replication, (ii) a priority value over line 134 for each cell specifying the priority level for the cell at the selected output port, and (iii) the VP/VC connection address over line 136 of the selected output port. If the cell does not require multicast replication, it is passed onto an appropriate one of the unicast output queues 130.

Figure 2:
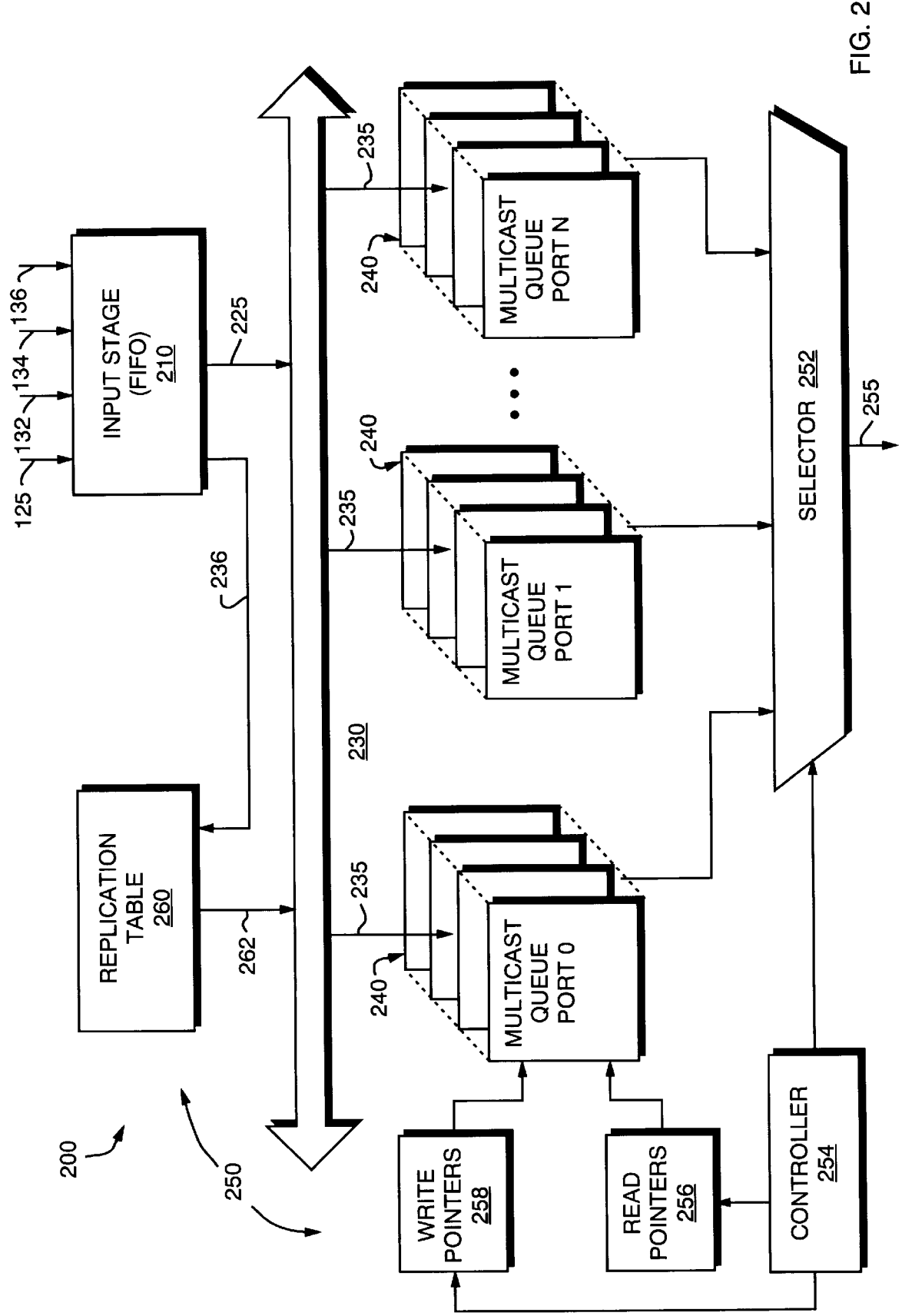
FIG. 2 is a schematic block diagram of a multicast engine having a generally pipelined architecture comprising an input stage and an output stage in accordance with the present invention.

If the cell requires multicast replication, it is forwarded to a separate multicast engine circuit 200. FIG. 2 is a schematic block diagram of the multicast engine 200 having a generally pipelined architecture comprising an input stage 210 and an output stage 230 that interact with the other components of switching fabric 110 to increase the replication rate of a cell destined for multicast connections. In accordance with the invention, the engine and the switching fabric circuit cooperate to store a single copy of each multicast data element in a location of the shared memory 112 and to replicate only an address pointer to that memory location for each destination of the multicast connection. This cooperating feature of the invention thus provides a multicasting capability that reduces the total buffer requirements of the switch 100.

The input stage 210 of the multicast engine 200 preferably comprises a buffer memory that stores information prior to manipulation by the output stage 230. In the illustrative embodiment, the information stored in the buffer includes the key, priority value and connection address, along with the address pointer to the payload location in shared memory. Because it may be busy processing similar information for a cell previously issued by the switching fabric 110, the output stage 230 may not be available for immediate use; accordingly, there may be some degree of "latency" associated with the output stage of the engine 200. To accomodate such latency, an M-location (e.g., 128 location) first-in first-out (FIFO) buffer is preferably employed as the input buffer stage.

The output stage 230 essentially comprises a plurality of multicast output queues 240 manipulated by control logic 250 to replicate an input cell destined for a multicast connection. As is the case for unicast traffic, there is preferably one multicast output queue 240 for each output port of the switch at each predetermined priority level. In the illustrative embodiment, the engine preferably maintains (N+1) * P (e.g., 132) independent output queues for multicast replication, one for each of the N ports of the switch and the CPU at the P levels of priority. The number of replicated cells is a property of the multicast connection address stored in the FIFO 210; accordingly, the connection address on line 136 is used to determine the number of replicated cells needed for the multicast connection.

Specifically, the connection address is used as an index into a replication table 260 of the control logic 250. In the illustrative embodiment, the replication table has a plurality of entries, each of which is accessible by a unique VP/VC address on line 236 and each of which contains control information specifying selected output queues for receiving the multicast cell. The full address space of the VP/VC connection address may not be needed to support the illustrative implementation of the table 260; accordingly, only a subset of the VP/VC connection address space may be required to address each entry of the table.

The control information contained in each entry is preferably manifested as a mask, which is provided over line 262. The output stage latency consumed by the input FIFO buffer stage 210 is primarily attributable to "reading" of these addressed entries of the replication table 260. Multicast replication is thereafter effected by copying the address pointer of a multicast input cell into each of the selected multicast output queues specified by the control information (over line 235). Replication and queuing of the address pointers to the respective multicast queues 240 "mirror" that of the unicast queues 130 for unicast cell connections.

The CPU 106 controls the number of multicast output queues 240 selected for a particular multicast connection by writing the mask, e.g., a unary encoded bit pattern, into the respective entry of the replication table. A copy of the address pointer on line 225 is then "queued" on each multicast output queue 240 corresponding to each bit set of the respective mask on line 262. In other words, each asserted bit within a VP/VC entry of the replication table corresponds to a multicast output port which is to receive a multicast cell. The N+1 (e.g., 33rd) VP/VC entry of the replication table is reserved for a copy of the pointer for the CPU 106.

The control logic 250 also includes a selector circuit 252 that is controlled by a conventional controller circuit 254 to transfer multicast cells to selected output ports of the switch in accordance with a "fair-sharing" arbitration policy described herein. The logic 250 further includes a plurality of read pointers 256 and write pointers 258 controlled by the controller 254; in the illustrative embodiment, these pointers are organized in read/write pointer pairs to implement the multicast queues 240 associated with each output port 104.

Specifically, the contents of the write pointer 258 specifies the next available location in a respective queue 240 for storing the contents of the address pointer (as specified by the replication mask) on line 235, whereas the read pointer 256 marks the contents of the next "cell" location in shared memory 112 to be retrieved from the queue. These read/write pointer pairs generally "wrap" around the maximum address of a continguous set of memory locations dedicated to each output queue, thereby simulating a circular queue. Queue occupancy is preferably determined by calculating the difference between the values of the read/write pointers associated with each queue.

According to an aspect of the invention, the multicast engine 200 reproduces only the contents of the address pointer within each selected output queue, rather than copying the entire contents of the cell; this enhancement increases the replication rate of the multicast operation while also reducing the buffer capacity required for that operation. Furthermore, the multicast engine manipulates the address pointer to produce the required number of replicated cells prior to releasing the payload location in shared memory.

More specifically, the multicast logic engine copies the K-bit pointer address from the input buffer stage of the pipeline to selected queues in the output stage during each cycle of replication, e.g., during a system cell time period. The system cell time period is N*2+E (e.g., 68) cycles in duration comprising an N-cycle input phase (e.g., N=32) and an N+E-cycle output phase (e.g., E=4). The multicast engine may replicate the address pointer N times per cycle during the input phase, and up to N−2 times per cycle during the output phase; this latter parameter is contingent upon the selected multicast output queues not having cells ready to transmit to entities of the network. Accordingly, the multicasting capability of the shared memory fabric 110 provides an effective replication rate of up to 2*N−2 (e.g., 62) copies per cell time.

As the addresses of the cell payloads are retrieved from the input FIFO, the write pointers 258, under control of the controller 254, "write" the cell address pointer to the selected queues and advance to the next available queue locations as long as those queues are not full. If a copy of the address pointer cannot be stored in a selected output queue because that queue is full, then the entire multicast connection is dropped and the address pointer of the multicast cell is returned to the end of the FIFO 210. For this reason, only 127 memory addresses of input multicast cells can be temporarily stored in the 128-location multicast FIFO. Moreover, when the FIFO is completely full, subsequent input cell addresses are dropped until some of the temporarily-stored addresses are retired.

A "leaf count" data structure (not shown) is contained within the replication table 260 to maintain a count of the number of address pointer copies needed for a particular multicast cell. This structure provides the multicast engine with information needed to determine when to retire the cell and when to release the payload location of the cell in shared memory for use by another multicast cell. The controller 254 may manipulate the leaf count structure to reverse a decision to increment (or decrement) the leaf count if an output queue is unable to accept a copy of the address pointer because of a buffer-full condition. Because of the pipelined design of the engine, the effect of such a reverse decision is, as noted, dropping of the multicast connection and returning of the address pointer to the end of the input FIFO.

Figure 3:
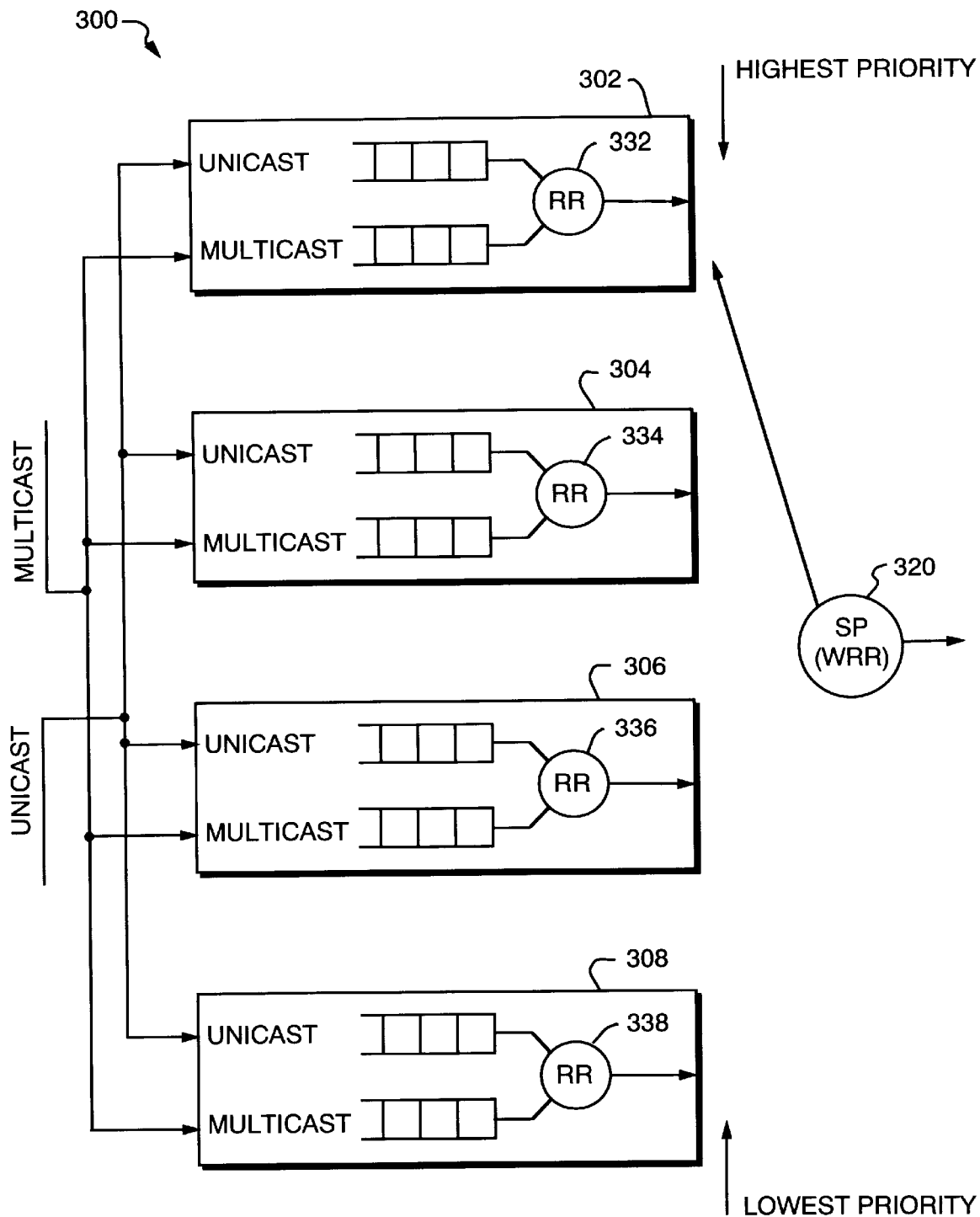
FIG. 3 is a highly schematized diagram depicting a novel fair-sharing arbitration policy in accordance with the invention.

In furtherance of its switching function, the shared-memory fabric circuit 110 determines whether a unicast or multicast cell is transferred to a selected output port 104 of the switch using a "fair-sharing" arbitration policy. According to the invention, this novel policy services the unicast and multicast queues in parallel based on the relative priority levels of the queues. FIG. 3 is a highly schematized diagram depicting the novel fair-sharing arbitration policy 300. In the illustrative embodiment, the arbitration logic needed to implement the policy 300 is preferably the selector circuit 252 (FIG. 2), together with read and write pointers 256, 258, under control of controller 254 of control logic 250.

As can be seen in FIG. 3, each port of the switch has a unicast/multicast output queue pair for each predetermined priority level. Preferably, there are four (4) priority levels, ranging from the highest priority level queue pair 302 to the lowest priority pair 308. At each cell time, the arbitration mechanism 300 evaluates the states of the queue pairs and transmits a cell from a non-empty pair having the highest priority as determined by, inter alia, the queue occupancy calculation. That is, the queue service algorithm at the output ports is strict priority (SP) as indicated by the SP component 320. It will be apparent to those skilled in the art that any other service discipline, such as weighted round robin (WRR), may also be used as the queue service algorithm. However, priority of transmission within each queue pair (i.e., at each level of priority) alternates between their multicast and unicast elements at each cell time. These queue elements are "fairly shared" via four independent round robin (RR) subarbiter circuits 332–338 which, in the illustrative embodiment, are 2-state selectors that "skew" selection of the cell at each priority level.

When selecting an output port to transmit an output cell during the output phase of the system cell time period, the controller 254 compares the priority of the unicast and multicast queues, and further examines the current states of the RR circuits 332–338. If a cell pointer address is awaiting transmission in any of the priority output queues, then that cell address is transmitted at the appropriate time during the output port sequence. That is, the individual queues avoid "head-of-line" blocking on the output ports by transmitting a pending cell.

The arbitration logic determines whether a unicast or multicast cell address is selected on each output cycle. For example, if the state of an RR subarbiter of a selected queue is "1" and both a unicast and multicast cell are ready for transmission, then the unicast cell is selected. On the other hand, if the subarbiter state is "0", and both a unicast and multicast cell are ready for transmission, then the multicast cell is selected. Upon selecting the multicast cell, the controller increments the read pointer 256 for the appropriate queue and the address pointer to the payload location in shared memory is provided over output line 255 of the selector 252. Thereafter, the state of the RR subarbiter is set to "1" to favor a unicast cell next time.

Referring again to FIG. 1, the selected pointer address on line 255 is fed to the shared memory unit 112 in order to retrieve the corresponding cell payload information over line 118. The assemble circuit 116 of switching fabric 110 appends new header information on line 124 to the payload data retrieved on line 118 prior to transmitting the selected cell of the output cycle. This header information is derived by OTF 122 in response to the connection address generated by the ITF 120. The header information is preferably stored in an output header table (not shown) of the ITF 120. For an N-port switch, there are N locations of output headers for multicast cells; consequently, the output header table may be accessed using the port number of the switch as part of an index to the table. It is thus apparent that the method and apparatus of the present invention efficiently implement multicasting operations without consuming substantial memory resources.

While there has been shown and described an illustrative embodiment for increasing the replication rate of data elements destined for multicast connections within a network switch using a fast multicast engine of a shared-memory switching fabric circuit, it is to be understood that various other adaptations and modifications may be made within the spirit and scope of the invention. For example, in an alternate embodiment of the invention, head-of-line blocking may be obviated by employing two sets of thirty-two multicast output queues, each having individual read and write pointers.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for replicating a data element destined for a multicast connection within a network switch using a multicast engine of a switching fabric circuit, the data element having an address portion and a data portion, the method comprising the steps of:

extracting the data portion from the data element and storing that portion in a location of memory;

recording the memory location of the data portion in an address pointer;

copying only the memory location of the data portion to selected output queues of the multicast engine;

retrieving the stored data portion for each copy of the memory location in accordance with a fair-sharing arbitration mechanism having a service policy that is one of strict priority and weighted round robin among the output ports;

appending a new address portion to the retrieved data portion to replicate the data element destined for the multicast connection; and processing the address portion of the data element to generate a multicast connection address.

2. The method of claim 1 wherein the step of appending a new address portion comprises the step of deriving the new address portion in response to the multicast connection address.

3. The method of claim 1 further comprising the step of determining the number of memory location copies needed for the multicast connection.

4. The method of claim 3 wherein the step of determining comprises the step of addressing a selected entry of a replication table using the multicast connection address, the replication table having a plurality of entries.

5. The method of claim 4 wherein the step of determining further comprises the step of specifying the selected output queues for receiving the memory location copies with control information stored in the selected entry.

6. The method of claim 5 wherein the step of copying further comprises the step of copying the memory location of the address pointer to each of the selected output queues specified by the control information.

7. The method of claim 6 wherein the step of processing further comprises the step of processing the address portion of the data element to generate a priority value for the data element specifying a predetermined priority level for the element at the selected output ports.

8. Apparatus for replicating a data element destined for a multicast connection to entities of a network using a network switch having a plurality of output ports for transferring unicast and multicast connection traffic among the entities, the data element having an address portion and a data portion, the apparatus comprising:

a switching fabric circuit having a memory for storing the data portion of the data element in an address location thereof, the switching fabric circuit further having a plurality of unicast queues to accommodate the unicast connection traffic;

a multicast engine of the switching fabric circuit having a plurality of multicast queues for storing copies of the address location during a multicast operation, the unicast and multicast queues being associated into pairs of differing priority levels, each queue pair having a respective unicast queue and a respective multicast queue; and a fair-sharing arbitration mechanism for servicing the unicast and multicast queues in parallel based on the differing priority levels, the mechanism selecting a queue having a copy of the address location needed to retrieve the stored data portion prior to transferring the data element among the network entities.

9. The apparatus of claim 8 further comprising:

an extract circuit for extracting the data portion from the data element;

an address pointer for recording the address location of the data portion stored in the memory; and an assemble circuit for appending a new address portion to the retrieved data portion in order to replicate the data element destined for the multicast connection.

10. The apparatus of claim 9 wherein each output port of the switch has a respective queue pair for each priority level and wherein the arbitration mechanism comprises:

a selector for selecting an output port for transmission of the data element based on strict priority among the output ports; and a mechanism for alternating between the unicast and multicast queues of the respective queue pair when determining priority of transmission within a selected output port.

11. The apparatus of claim 10 wherein the differing priority levels range from high priority to low priority, and wherein the alternating mechanism comprises a round robin subarbiter circuit.

12. A method for replicating a data element destined for a multicast connection to entities of a network using a network switch having a plurality of output ports for transferring unicast and multicast connection traffic among the entities, the data element having an address portion and a data portion, the method comprising the steps of:

storing the data portion of the data element in an address location of a switching fabric circuit memory, the switching fabric circuit further having a plurality of unicast queues to accommodate the unicast connection traffic;

copying only the address location of the data portion to selected multicast queues of a multicast engine;

servicing the unicast and multicast queues in parallel in accordance with a fair-sharing arbitration mechanism based on relative predetermined priority levels of the queues; and selecting a queue having a copy of the address location needed to retrieve the stored data portion prior to transferring the data element among the network entities.

13. The method of claim 12 further comprising the steps of:

extracting the data portion from the data element and storing that portion in a location of memory; and recording the memory location of the data portion in an address pointer.

14. The method of claim 13 further comprising the step of, if a multicast queue is selected, appending a new address portion to the retrieved data portion to replicate the data element destined for the multicast connection.

15. The method of claim 14 wherein each output port of the switch has a queue pair consisting of a unicast element and a multicast element for each predetermined priority level and wherein the step of servicing further comprises the steps of:

selecting an output port for transmission of the data element based on one of strict priority and weighted round robin among the output ports; and alternating between the unicast and multicast elements of the queue pair when determining priority of transmission within the selected output port.

* * * * *